United States Patent [19]

Larsen

[11] 4,321,912
[45] Mar. 30, 1982

[54] SOLAR ENERGY COLLECTOR ASSEMBLY AND FRAME

[76] Inventor: Raymond B. Larsen, Berth 32, Issaquah Dock, Sausalito, Calif. 94965

[21] Appl. No.: 167,421

[22] Filed: Jul. 11, 1980

[51] Int. Cl.³ .............................................. F24J 3/02
[52] U.S. Cl. ..................................... 126/450; 126/432
[58] Field of Search .................... 126/432, 444, 450

[56] References Cited

U.S. PATENT DOCUMENTS 3,174,915 3/1965 Edlin .
4,036,209 7/1977 Press ................................. 126/432
4,203,425 5/1980 Clark ..................................... 126/45

FOREIGN PATENT DOCUMENTS 35548 3/1965 Switzerland .

*Primary Examiner*—Carroll B. Dority, Jr.
*Attorney, Agent, or Firm*—Flehr, Hohbach, Test

[57] ABSTRACT

A frame assembly including frame members (14, 14', 15, and 15') for supporting a plurality of films (31, 32, 33, and 34) in tension and in spaced relationship and for directing fluid between a pair of the films and receiving the fluid flowing from the pair of films. The frame members include an outer channel (17) and an inner spaced channel (20) with insulation (29) therebetween.

10 Claims, 7 Drawing Figures

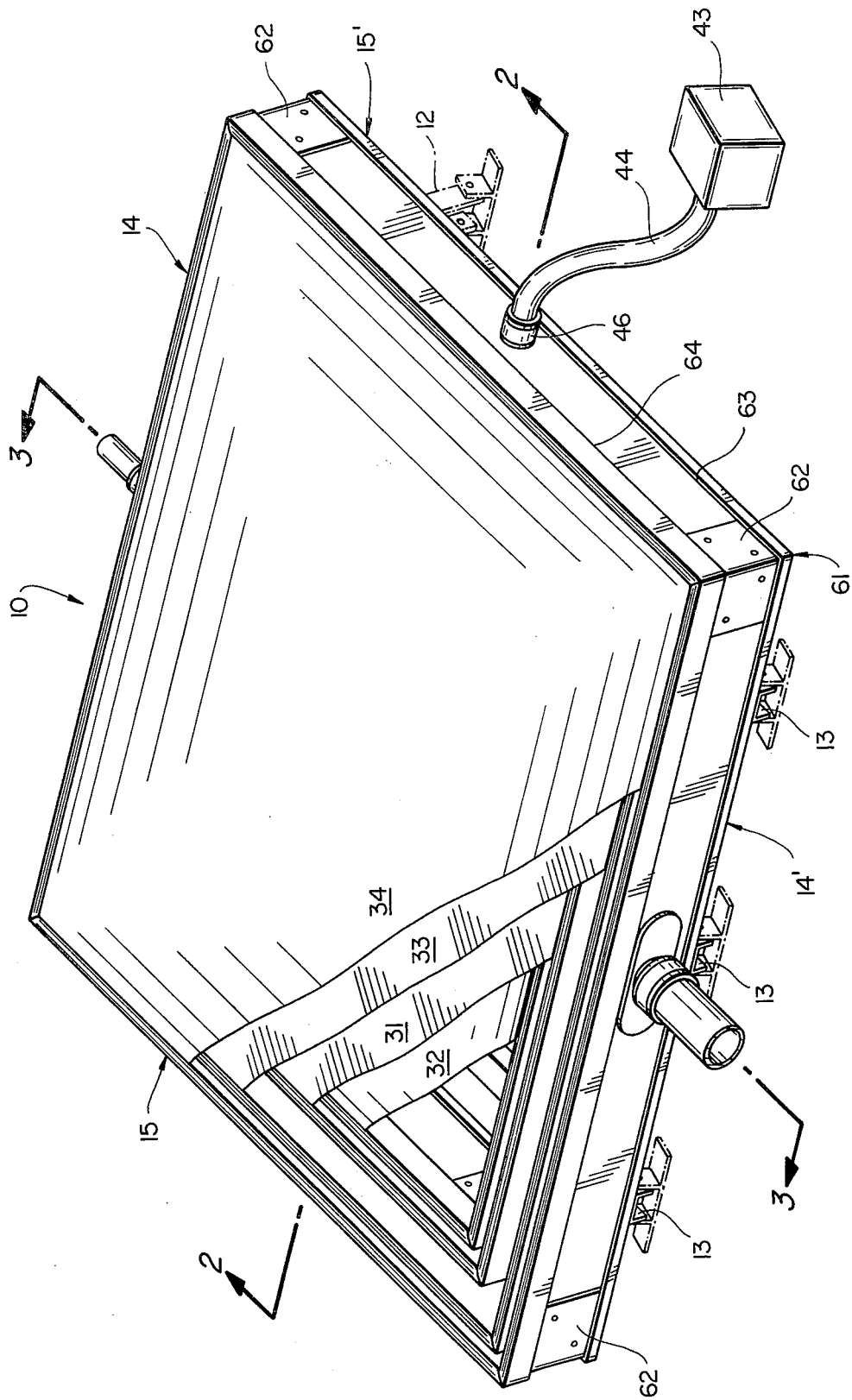

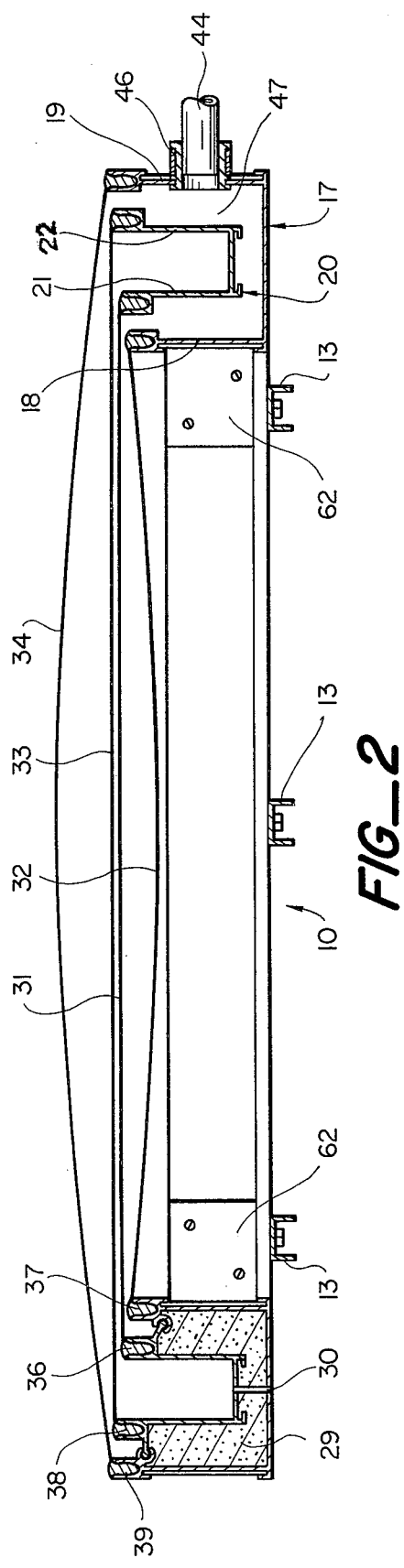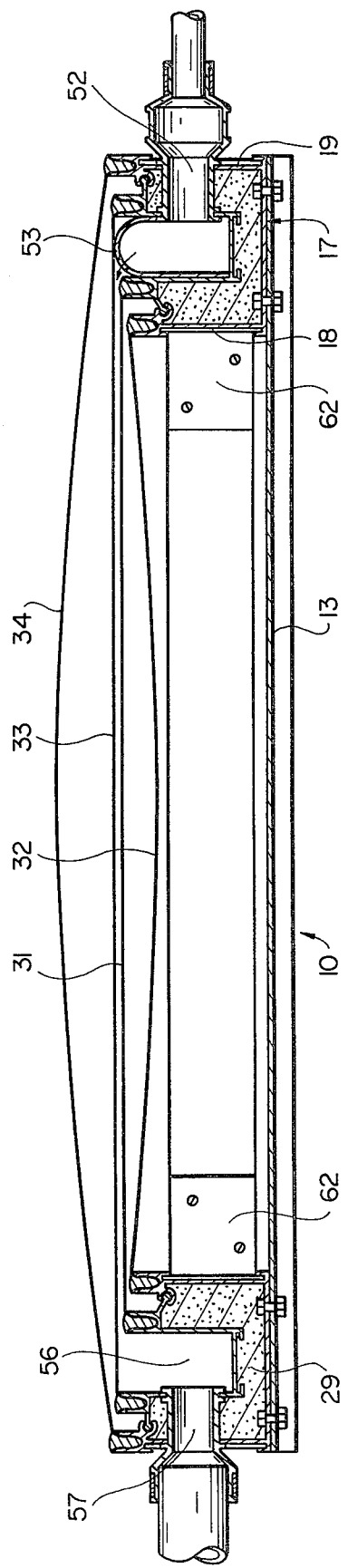

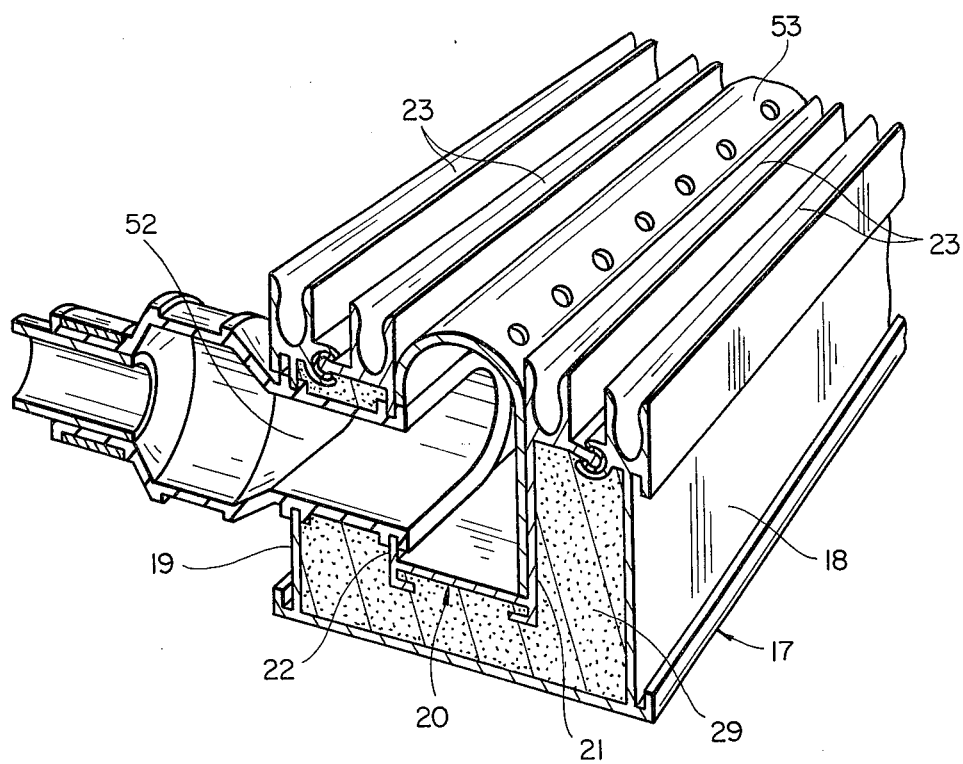
FIG_4
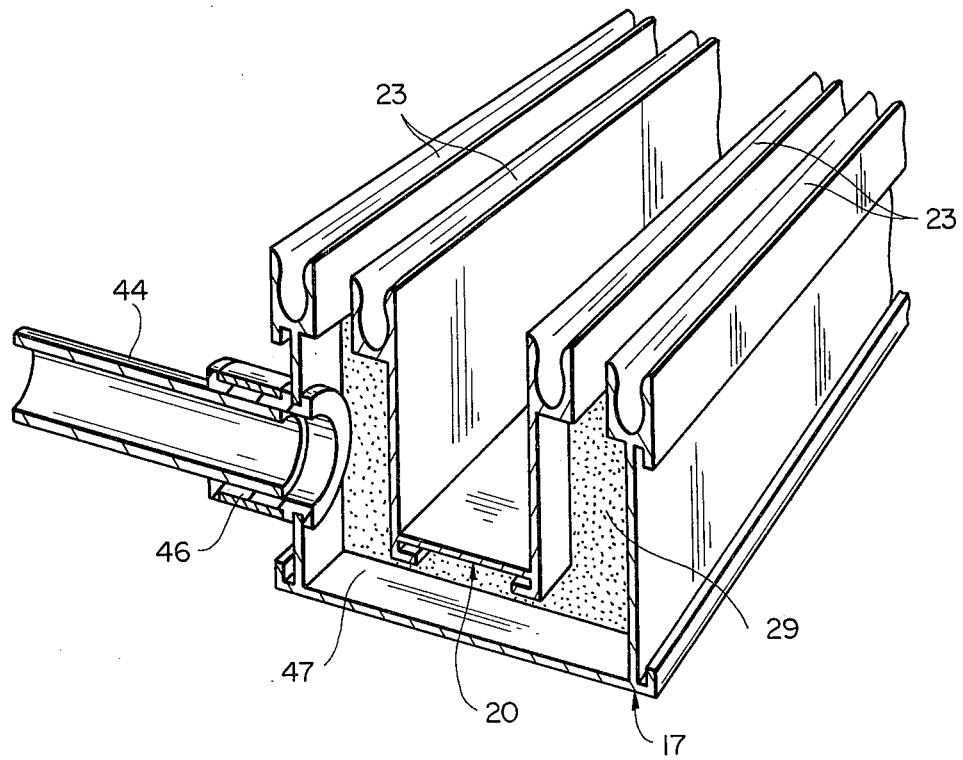
FIG_5

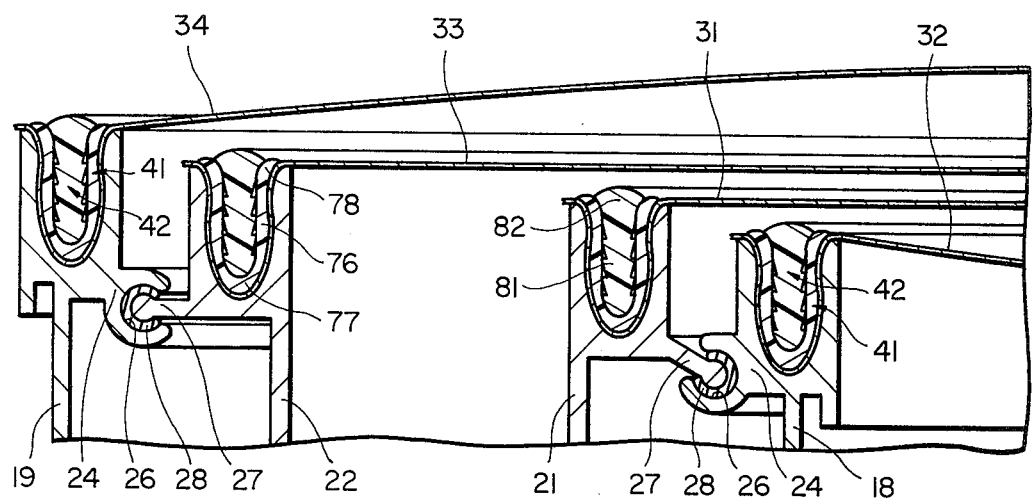
FIG_6
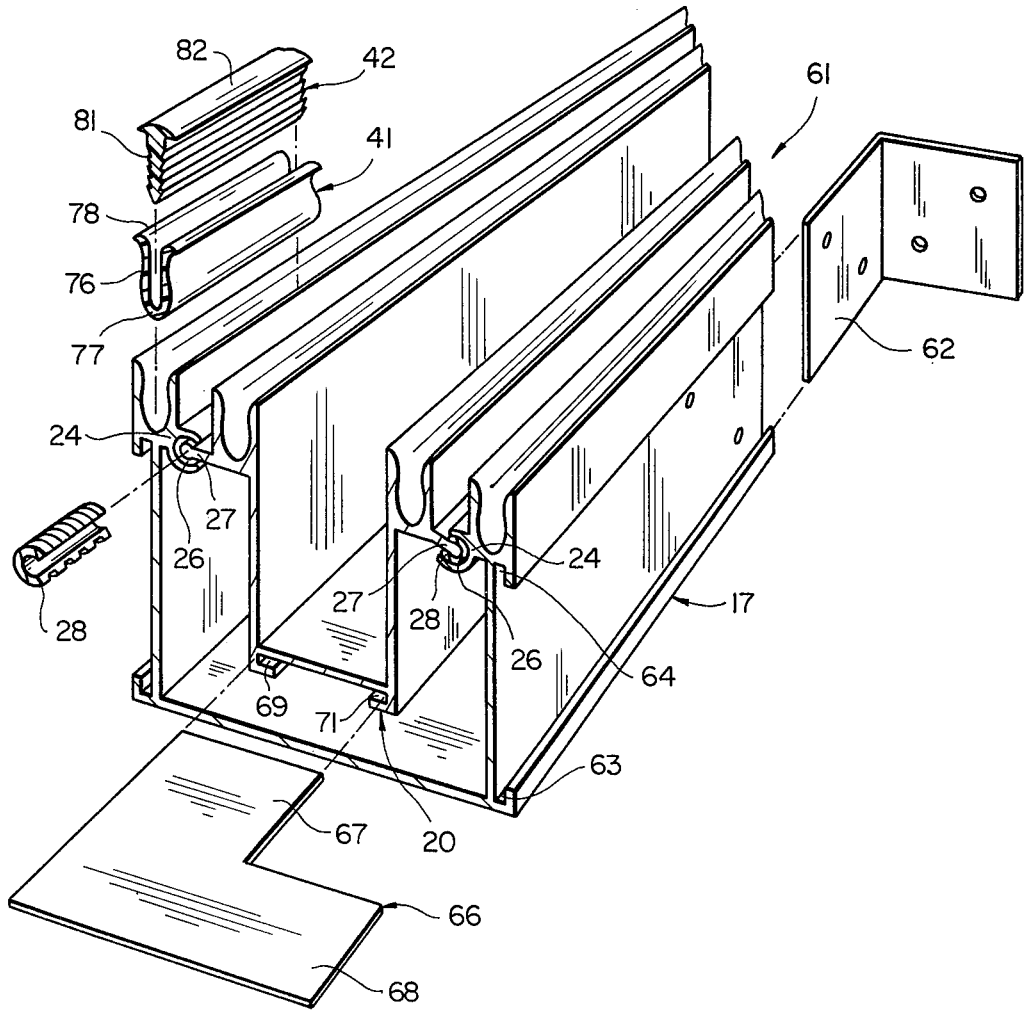
FIG_7

SOLAR ENERGY COLLECTOR ASSEMBLY AND FRAME

This invention relates to a solar energy collector assembly and more particularly to a frame assembly for releasably supporting a plurality of spaced flexible sheets forming the solar energy collector.

In my copending application, Ser. No. 965,618, entitled SOLAR ENERGY COLLECTOR ASSEMBLY, there is shown and described an assembly capable of directing an extremely thin film of water in direct contact with a flexible collector sheet. The assembly includes a flexible layer cooperating with the collector sheet to define a first air cushion. A pair of flexible layers, one of which is in contact with the other surface of the water film, form a second air cushion. By control of the air pressure in the cushions and the tension of the sheet and layers, a water film is maintained in intimate contact with the entire surface of the collector sheet. The sheet and layers in said copending application are supported by a peripheral connector and frame assembly. The connector and frame assembly establishes both the desired spacing and tension on the sheet and layers while permitting releasable but secure connection of the sheet and layers in place within the frame. The frame also provides the necessary communication with the water inlet and outlet channel headers and with the air supply for the cushions.

It is an object of the present invention to provide an improved header and frame assembly for solar energy collector panels of the foregoing type.

It is a further object of the present invention to provide a header and frame assembly which is inexpensive and simple to assemble.

It is still another object of the present invention to provide a header and frame assembly having low conductive heat losses.

In accordance with the present invention, there is provided an improved frame assembly for a solar energy collector of the type including a flexible collector sheet sandwiched between a pair of spaced flexible layers and another flexible layer. The sheet and layers are substantially coextensive and parallel to one another. The frame assembly includes a first elongated rigid channel having a groove at the upper edge of each of the channel sides, a second elongated rigid channel having a groove at the upper surface of each of its sides, said second channel being adapted to fit within the first channel and means for supporting the second channel in spaced relationship with respect to the first channel. The spaced grooves each receive the outer peripheral edges of said sheets and layers to support the same in parallel relationship and wedge means releasably insertable in each of said grooves releasably hold the sheet and layers in the grooves.

The above and other objects, advantages and features of the present invention will become more readily apparent when taken together with the following detailed description of the preferred embodiment in conjunction with the figures in which:

FIG. 1 is a perspective view of a solar collector system employing a frame assembly in accordance with the present invention.

FIG. 2 is a cross sectional view taken along the line 2—2 of the collector system shown in FIG. 1.

FIG. 3 is a cross sectional view taken along the line 3—3 of the collector system shown in FIG. 1.

FIG. 4 is a fragmentary detailed perspective view illustrating the water inlet side of the frame assembly.

FIG. 5 is a fragmentary detailed perspective view illustrating the air inlet side of the frame assembly.

FIG. 6 is a fragmentary cross sectional view of the frame illustrating the construction of the frame and the relationship of the wedge connectors when fully seated in the frame grooves.

FIG. 7 is an exploded fragmentary perspective view illustrating the preferred form of wedge connectors employed as the edge sealing means, the channel support spacers and the corner joints.

Referring in detail to the drawings, a solar energy collector system incorporating the present invention is illustrated generally in FIGS. 1-3. The assembly is a self-supporting stand-alone structure in which the solar collector assembly 10 is supported on legs 12 affixed to the rear or upper corners of the assembly. Horizontal braces or cross members 13 extend at spaced intervals across the width of the assembly. These members unite the frame and provides a means for attaching or mounting the frame on an associated structure. The assembly may then be placed on a suitable foundation or ground surface (not shown) and positioned at the desired angle, in accordance with well known practice, to most efficiently recover heat from the sun's rays. Typically, the angle of the assembly would be adjustable to compensate for changes in the angle of the sun above the horizon during various times of the year. In the alternative, the entire assembly as illustrated in FIG. 1 may be mounted on a flat roof and the supporting legs 12 firmly affixed in place to the roof, or when used on pitch roofs, the frame assembly may be built directly into the roof without the use of legs or other supports. At the outset, it will be apparent that the supporting structure employed for the frame assembly 10 may take many forms. It is shown in FIG. 1 as a setting for the present invention. The inventive features of the system are incorporated in the structure and arrangement of the elements making up the collector frame.

As illustrated in FIGS. 1 to 7, the preferred form of the frame for the collector assembly 10 is broadly comprised of an outer generally rectangular frame having opposite side frame members 14 and 14' and opposite end frame members 15 and 15'.

As shown in FIGS. 2–7, each frame member 14, 14', 15 and 15', includes a first or outer channel 17 having sides 18 and 19 and a second inner channel 20 having sides 21 and 22. The second or inner channel is adapted to fit within the first channel and spaced therefrom. The upper edges of the sides of the channels 17 and 20 are provided with longitudinal grooves 23. The outer channel includes flanges 24, FIG. 6, extending inwardly from the sides of different levels opposite one another. The flanges include an elongated cylindrical groove 26. The inner channel includes lips 27 extending outwardly from the sides to cooperate with the elongated grooves 26. The flanges 24 and lips 27 serve to support the inner channel in space relationship to the outer channel. In accordance with one feature of the present invention, the groove and lip are maintained in space relationship by spacers 28, FIGS. 4, 6 and 7. The spacers are made of thermal insulating material and grooved to provide point contact to thereby minimize heat exchange by conduction between the channels 17 and 20. In addition, substantially all of the space between the channels is filled with an insulating material 29 to further decrease conductive or radiative heat losses between the channels. As will presently become apparent, this lowers heat losses through the frame to the surrounds. The insulating material 29 may be a foamed material. The insulating formed in place material provides rigidity to the frame assembly.

The frame provides means for suspending a series of flexible layers across the entire frame assembly, each layer being of generally rectangular configuration corresponding to the sides of the frame assembly and having outer peripheral sides and end edges adapted from mounting in the channel grooves 23.

As described in said copending application and referring to FIGS. 1-3, the collector includes an upper intermediate collector sheet 33 cooperating with upper air distribution layer 34 and lower intermediate layer 31 cooperating with lower air distribution layer 32. As best seen in FIGS. 1 through 7, in order to establish a predetermined spacing between the layers, each channel includes sides with upper grooves 23 which extend the entire length of each frame member. The collector sheet 33 has its outer peripheral end and side edges disposed in the groove 38, the lower layer 31 having its outer edges disposed in lower groove 36 and the outer layers 32 and 34 having their outer edges disposed in grooves 37 and 39. The sides of the channels 17 and 18 are of different heights increasing in height as one travels from the center to the outside edges of the frame to provide a spacing between the sheet and the layers when they are securely mounted and tensioned in the frame.

The securing means provided for mounting the collector sheet 33 and their distribution layers 31, 32 and 34 are preferably defined by the wedge connectors shown in FIGS. 6 and 7, there being an outer female wedge connector 41 which operates as a means of preliminary location and tensioning in affixing of the outer peripheral edge of each layer and sheet. An inner male wedge member 42 is then forced down inside the female wedge permanently affixing and sealing each layer and sheet in place under predetermined tension in a manner hereinafter described in more detail.

Referring to FIGS. 1, 2 and 5, air under pressure is supplied from a blower 43 to form air cushions. Inlet hose 44 is connected to air inlet assembly 46, affixed to one end of the frame assembly. The inlet extends through the side of the outer channels and communicates with the space between the channels. This introduces air under pressure into a space 47 between the insulation 29 and upwardly through a hole formed by cutting off a portion of the flange 24 or lip 27 as shown in FIG. 2, or by drilling holes therethrough. The air then flows between the layers 33 and 34 and lower layers 31 and 32 to form air cushion layers. The air or other fluid supplied to the cushions maintains a slightly positive gauge pressure in the air cushion defined by the lower air distribution layers 31 and 32 and collector sheet 33 and upper glazing layer 34. This assures a continuous uniform flow of a film of water between the upper and lower surface of the sheets 31 and 33. Preferably, the spacing which is maintained between the collector sheet 33 and the layer 31 is in the order of 10 mils to establish a thin continuous film of water on the collector surface. The spacing is maintained through the combination of predetermined air pressure in the air cushions and the tension of the plastic layers and sheet.

The heat transfer medium, preferably water, is introduced into the inner channel of the upper frame member. The channel defines an inlet header extending along the upper side of the frame 14 of the assembly. The header cooperates with the conduit 52 and communicates with a water distribution manifold 53. The manifold 53 is defined by an arcuate tubular section composed of a resilient sheet which is bowed into inverted generally U-shaped configuration so that it is free and can be inserted in the channel to extend the full length of the upper side of the frame member 14. The water is introduced to the channel through the conduit 52 which is sealed in engagement with the side of the inner channel and extends past the outer channel for connection with an associated water supply. Water which passes over the sheet 31 is collected in lower channel 56 and flows through the fitting or conduit 57.

Referring to the drawings, particularly FIGS. 1 and 7, it is seen that the channel members forming the ends and sides are joined at the corners 61. The adjoining corners form complementary angles so as to be disposed in abutting relationship to one another. The corners are attached by a suitable angle member 62 which extends into spaced grooves 63 and 64 formed on the outer channel member and by a plate 66 which has arms 67 and 68 which extend into the spaced grooves 69 and 71 formed in the lower side of the inner channel member.

The female and male wedge connector assemblies 41 and 42 facilitate attachment of the outer peripheral edges of the sheet and layers in place within the frame member. As shown in FIGS. 6 and 7, wedge connectors 41 and 42 are correspondingly formed to be of a length to extend continuously around the circumference of the entire assembly, and each is composed of a rubber or rubber-like material possessing limited flexibility and resiliency in securing the outer peripheral edges of the layers in place within their respective grooves. The female wedge connector 41, as shown in FIGS. 6 and 7, is of generally U-shaped configuration having relatively thick sides 76 joined by a lower closed end 77, and upper outwardly tapered ridges 78 extending laterally away from opposite sides 76. The cross-sectional width of the connector 41, including the space between the sides 76, corresponds to or is normally slightly less than the width of the groove 23 so that as a first step in the location of each layer and sheet with respect to its channel the connector 41 can be pressed against the flexible layer to urge it downwardly into the channel so as to preliminarily locate and position the layer or sheet in place. Once the female wedge connector 41 is fully inserted into the channel, any minor adjustment or tightening may be made until the layer is fairly taut and wrinkle-free. Thereupon the male connector 42 is driven into space between the sides 76 of the connector to cause the sides to be expanded outwardly, thereby lengthening the cross-sectional perimeter to exert a slight stretching force upon the layer or sheet while firmly bearing against the sides of the groove 23.

Preferably, the wedge connector 42 is T-shaped and comprises a ribbed stem 81 which corresponds to the depth of the spacing within the connector 41 and has an enlarged rounded head 82 wider than the space so as to limit the downward insertion of the connector 42 into the connector 41. The ribbed external surface of the connector 42 will minimize frictional resistance of the connector as it is driven downwardly into the connector 41 while assuring a tight fit between the connector elements once the connector 42 is fully inserted along the entire length of the connector 41. The wedge member 42 can be forced into position by manual pressure or with the aid of a hammer by tapping along the upper edge until it is fully inserted and, upon insertion, the assembled wedge members will securely position the stretch-resistant plastic layers under the desired tautness for extension across the entire panel. The edges of the grooves are rounded whereby to avoid point contact between the sheets and layers and the grooves to reduce points of stress concentration. The wedge connector assembly, as described, will cooperate with the groove 23 in that as the plastic layers are extended across the assembly and anchored in place, any increasing degree of tension applied to the plastic layer will tend to cock or press the channel extrusions inwardly to maintain the desired spacing between the layers.

In use, the frame assembly may be constructed of different sizes depending upon its specific application; and while the frame may be of modular construction so as to permit placing together of a series of frame assemblies, it is much preferred to construct the entire assembly of one single frame of the desired size since material costs and assembly costs per square foot of collector surface are substantially reduced as the size of the assembly increases. In a typical installation, some cooling of the water which is stored in the storage tank will be experienced during the night so that when the unit is in operation during the early morning hours, the relatively cool water or other fluid would be pumped from the storage tank through the collector assembly as the collector sheet is being heated by the sun's rays. During each pass, the water or fluid circulated from the storage tank may increase in temperature only on the order of 3° F. After continuous recirculation of the water or fluid from the tank through the collector assembly, however, the water or fluid temperature will be progressively increased throughout the collection hours of the day and the water or fluid in the storage tank will therefore become hotter. If no water or fluid were circulated through the panel or collector assembly absorber surface, the collector sheet would reach some maximum temperature which would be the absolute upper limit on the temperature of the hot water or fluid. In practice the water or fluid temperature would always be less than this maximum collector sheet temperature.

In accordance with standard practice, however, heat is being transferred from the collector sheet during the early morning hours at the lowest panel temperature when radiation heat losses would be relatively small and collector efficiency the highest. As the water or fluid temperature increases later in the day and the collector sheet is hotter, the collector efficiency will be reduced. Nevertheless, by carefully controlling the thickness and uniformity of the film of water or fluid between the air cushion layers and at the same time maximizing the rate of flow of water or fluid, extremely high heat transfer coefficients are realized and the collector efficiency averaged over a day is relatively high. For example, the flow rate of water or fluid 10 mils thick over a panel surface on the order of 6' by 20' in size would be in the range of 10 to 15 gallons per minute. Most importantly is that while the collector assembly may be prefabricated for installation at a particular site, adjustments in the tension of the layers, thickness of the water or fluid film as well as spacing between layers as described, can be readily made to realize maximum efficiency from the system.

Although the present invention has been described with particularity relative to the foregoing detailed description of the preferred embodiment, various modifications, changes additions and applications other than those specifically mentioned herein will be readily apparent to those having normal skill in the art without departing from the spirit of the invention.

What is claimed is:

1. A frame assembly for a solar energy collector of the type including a flexible collector sheet, a layer disposed above said sheet in cooperative relationship with the sheet, a pair of layers disposed below said sheet with one in cooperative relationship with the sheet, said sheet and layers being substantially coextensive and parallel to one another, said frame assembly including sides comprising a first elongated rigid channel having upwardly extending sides and a groove along the upper surface of each of the sides, a second elongated channel having sides and a groove at the upper surface at each of said sides, said second channel being adapted to fit within the first channel, and means for supporting the second channel in space relationship with the first channel, said assembled channels providing space grooves each receiving the outer peripheral edges of said sheet and one of said layers to support the same in parallel spaced relationship and securing means insertable in each of said grooves for releasably holding the edges of sheet and layers.

2. A frame assembly as in claim 1 in which said first and second channels are metallic and said means for supporting the second channel in spaced relationship with the first channel includes means for insulating the second channel from the first channel.

3. A frame assembly as in claim 1 in which said means for supporting said second channel in spaced relationship with the first channel includes means including a groove formed in each side and a lip formed in each side adapted to fit within the groove.

4. A frame assembly as in claim 3 in which said grooves are formed on said first channel sides to extend inwardly, and said lips are formed in each second channel sides to extend outwardly from said second channel sides.

5. A frame assembly as in claim 4 wherein insulating means are disposed in said grooves to receive said lips.

6. A frame assembly as in claim 1 in which a substantial portion of the space between said first and second channels is filled with insulation.

7. A frame assembly as in claim 1 including means for feeding fluid into said second channel whereby it flows between said sheet and cooperating layers and for removing fluid from said channel after it has flowed between said sheets.

8. A frame assembly as in claim 7 including means for supplying air to the space between said upper layers and between said collector sheet and lower layer.

9. A frame assembly as in claim 6 including means for feeding fluid into said second channel whereby it flows between said sheet and cooperating layers and for removing fluid from said channel after it has flowed between said sheets.

10. A frame assembly as in claim 9 including means for supplying air to the space between said upper layers and between said collector sheet and lower layer.

* * * * *